Feb. 10, 1948.　　　　H. J. DAVIS　　　　2,435,922
TAB CONTROL MECHANISM
Filed March 22, 1944

Inventor
HAROLD J. DAVIS
By
Attorney

Patented Feb. 10, 1948

2,435,922

UNITED STATES PATENT OFFICE 2,435,922

TAB CONTROL MECHANISM

Harold J. Davis, Kenmore, N. Y., assignor to Curtiss-Wright Corporation, a corporation of Delaware Application March 22, 1944, Serial No. 527,585

6 Claims. (Cl. 244—82)

This invention relates to aircraft of the type characterized by control surfaces which carry auxiliary airfoils for balancing and trimming purposes and more particularly the invention is concerned with improvements in control mechanisms for such auxiliary airfoils.

One object of the invention is to provide a mechanism of the kind generally described which is not only operative automatically to adjust an auxiliary airfoil to predetermined balance angles with respect to the control surface but which is also operative automatically to superimpose a trim adjustment upon the balance adjustment, the mechanism being so designed that the trim adjustment, which is variable, will be maintained substantially constant for the various angles of balance which the auxiliary airfoil may be caused to assume throughout the range of movement of the control surface.

A further object is to provide a control mechanism wherein the parts so nearly approach a straight line or rectilinear arrangement that they may be readily housed wholly within the airfoil assembly with which the mechanism is associated even though the airfoils of the assembly may be thin in cross section.

A still further object is a novel design and arrangement of the parts of the mechanism, whereby to provide for simplicity in construction and insure dependability in operation.

The invention is illustrated in the accompanying drawing in which.

Figure 1:
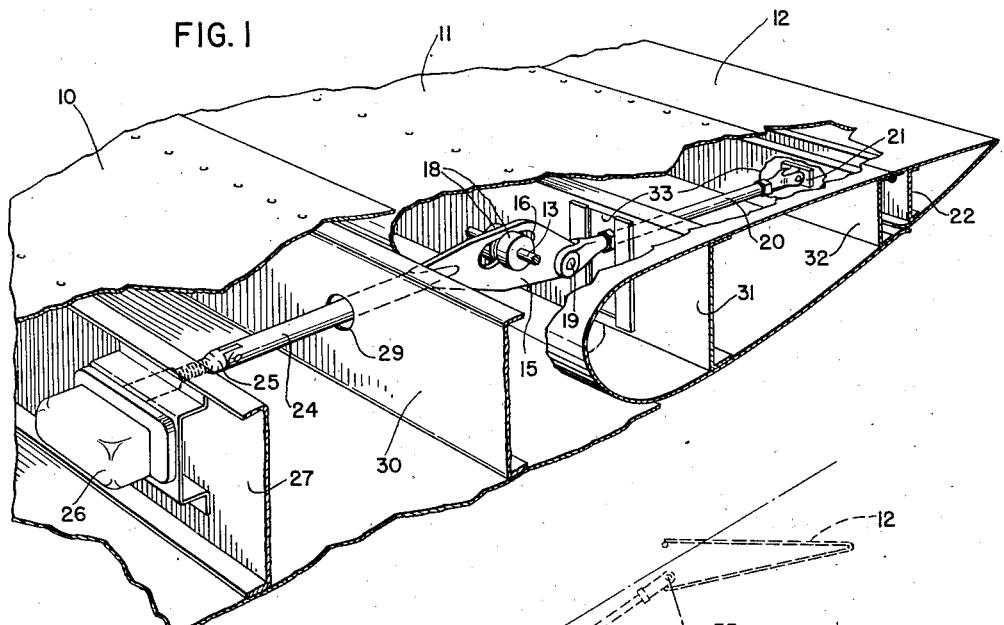
Figure 1 is a perspective view of a control mechanism embodying the features of the invention, portions of the airfoil assembly with which the mechanism is associated being shown in section.

The control mechanism may be associated with various airfoil assemblies. It is illustrated by way of example in connection with an assembly comprising a horizontal stabilizer 10, an elevator 11 which is hinged to the stabilizer and a tab 12 which is hinged to the elevator, the latter in accordance with conventional practice being movable in an "up" direction through a range of 30° with respect to neutral and in a "down" direction through a range of 20°.

As illustrated, the control mechanism includes a shaft 13 which is mounted in the leading edge of the elevator with its axis substantially coincident with the hinge axis of the elevator, the said shaft being secured to adjacent structure of the elevator by mounting brackets such as indicated at 14. The shaft 13 carries a slide 15, an arcuate slot 16 in the latter accommodating a bushing 17 which is held on the shaft against axial movement by collars 18. In an aft direction and below the hinge axis, a pin 19, which is carried by the slide 15, provides a pivotal connection for the forward end of a push-pull tube 20. The rear end of the tube 20 is pivotally connected to a bracket 21 which is carried by a transverse structural member 22 at the lower and leading edge of the tab, the hinge connection between the latter and the elevator being indicated at 23. A push-pull tube 24, which is connected at its rear end to the forward end of the slide 15, is pivotally connected at its forward end to an actuator screw 25. The latter is carried by a motor 26 which is mounted on a beam 27 of the stabilizer and extends through an opening in the beam and an opening 29 in an adjacent beam 30, beams 31 and 32 of the elevator being formed with suitable openings 33 through which the push-pull tube 20 may extend.

It will be noted that the forward end of the push-pull tube 24 is, through the agency of the screw 25 and the motor 26, supported by the beam 27 of the stabilizer. The shaft 13 is carried by a movable airfoil but, being coaxial with the axis about which such airfoil turns, provides a fixed support for the slide 15, the bushing 17 providing a bearing in which the shaft 13 turns as the elevator swings about its hinge connection with the stabilizer. The movements of the elevator having no influence on the slide 15, the axis about which the push-pull tube 20 swings is fixed for any position of adjustment of the slide.

Figure 2:
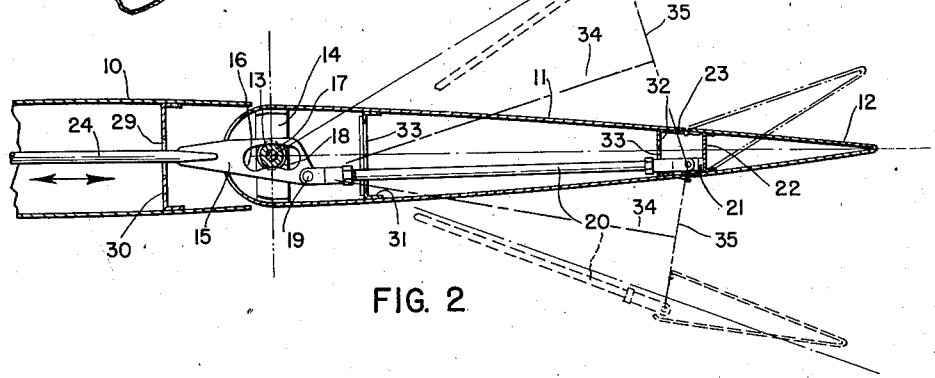
Figure 2 is a transverse section through the airfoil assembly with which the control mechanism is associated, the said mechanism being shown in side elevation.
Figure 3:
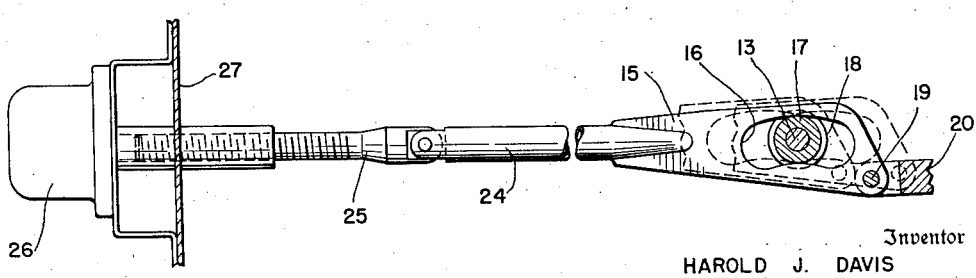
Figure 3 is an enlarged side elevational view of the control mechanism.

The angular relation of the tab 12 with respect to the elevator 11 in any particular position of the latter is a sum of the balance and trim angles for such position. The range of balance angles for the tab will, of course, be predetermined by the particular characteristics of the airplane with which the control surface is employed. In the embodiment of the invention illustrated, the control mechanism is so designed that at the upper limit of the range of movement of the elevator the tab will have a downward balance deflection of approximately 25° while at the lower limit of the range of movement of the elevator the tab will have an upward deflection of approximately 5°. To this end, assuming the slide 15 to occupy the neutral position shown in full lines in Figure 2, the pin 19 is offset (with relation to the hinge axis of the elevator) aft and in the direction of minimum deflection of the tab a distance such that as the elevator swings about its hinge axis and the push-pull rod 20 swings about the pin 19, the tab will be actuated through the balance range of movement indicated.

In the embodiment of the invention illustrated, the tab 12 may be adjusted in either "up" or "down" directions, to a maximum trim angle of 25°. To add any desired trim to the tab 12 it is only necessary to energize the motor 26 to cause the push-pull tube 24 to be moved in a fore or aft direction, depending upon whether positive or negative trim is desired. As the slide 15 is actuated by the push-pull tube 24 from the neutral position shown in Figure 2, the arcuate slot 16 causes it to guide the pin 19 in an arcuate path, upwardly if the tube 24 is moved in an aft direction and also upwardly if the tube is moved in a forward direction, the pivotal connection between the screw 25 and the tube permitting the necessary slight lateral pivotal movement of the slide as the walls thereof guide the pin 19 in the manner described. In this connection it is to be noted that the curvature of the slot is predetermined with respect to the length of the tube 20 and the offset relation of the axis of the pin 19 with respect to the hinge axis of the elevator in the neutral, or no trim, position of the slide 15. Knowing the length of the tube 20, the curvature of the slot may be readily determined graphically for any particular ranges of balance and trim angles. For example, assuming the balance and trim ranges for the tab to be those indicated, it is only necessary to lay out diagrammatically tab balance positions corresponding to the neutral position of the elevator, the upper limit of displacement of the latter and also its lower limit, all with no trim. Perpendicular bisectors 34 from the lines 35 (Figure 2) through the three positions of the pin by which the tube 20 is connected to the tab will intersect at a point corresponding to the neutral position of the pin 19, i. e., the position shown in Figure 2. Similarly, two other theoretical positions of the pin 19 may be found, one by the intersection of perpendicular bisectors 34 when the connection between the push-pull tube 20 and the tab occupies a position corresponding to a maximum positive trim adjustment and the other by the intersection of said bisectors when the connection between the push-pull tube and tab occupies a position corresponding to a maximum negative trim adjustment. An arc through the three positions of the pin 19 will conform in curvature to a median line through the slot 16, although being inverted as to curvature because the desired adjustment of the pin 19 is obtained by movement of the slide. When the curvature of the slot is obtained in this manner, any adjustment of the mechanism for trim purposes will insure a trim angle which will be substantially constant throughout the range of movement of the elevator even though the balance angle of the tab at one limit of the range of movement of the elevator may be different from the balance angle at the opposite limit. In this connection it will be noted that the adjustment of the slide 15 for the purpose described does not alter the length of the tube 20. Hence the radius of the arc traversed by the pivotal connection of the push-pull tube 20 with the tab 12 is fixed and is not altered by, or as an incident to, such adjustment. The axis of the shaft 13 being coincident with the hinge axis of the elevator, the axis of the pin 19 will remain fixed in any adjusted position and will not be displaced as the elevator moves about its hinge axis. These characteristics of the control mechanism not only insure a trim angle which will be substantially constant throughout the range of movement of the elevator but have the advantage that such trim angle may be increased and decreased, at will, as circumstances may require. As long idler and bellcrank arms are eliminated, the straight-line arrangement of the parts of the mechanism may be wholly housed within the airfoils with which the mechanism is associated. The mechanism has the further advantage that when, as shown, the control surface is designed for minimum deflection in one direction and maximum deflection in the opposite direction, it provides a maximum range of balance and trim angles for the tab.

I claim as my invention:

1. A control mechanism for aircraft having a supporting member, a control surface hinged to said supporting member and an auxiliary airfoil hinged to said control surface, said mechanism including a shaft mounted in said control surface, the axis of said shaft being substantially coincident with the hinge axis of said control surface, a slide formed with a guide slot in which said shaft is accommodated for cooperation therewith for guiding said slide, means having a connection with said slide in offset relation with respect to the hinge axis of said control surface and a connection with said auxiliary airfoil in offset relation with respect to the hinge axis of the latter, whereby movement of said control surface about its hinge axis causes predetermined relative movement of said auxiliary airfoil for balance purposes, and means for adjusting said slide on said shaft transversely of the axis thereof and in the direction of the guide slot to adjust said auxiliary airfoil for trim, the guide slot being effective to maintain a substantially constant trim adjustment over the range of movement of said auxiliary airfoil for balance purposes.

2. A control mechanism for aircraft having a supporting member, a control surface which is hinged to said supporting member for a minimum movement in one direction with respect to a neutral position and a maximum movement in the opposite direction and an auxiliary airfoil hinged to said control surface, said mechanism including a shaft mounted in said control surface, the axis of said shaft being substantially coincident with the hinge axis of said control surface, a slide formed with an arcuate guide slot in which said shaft is accommodated for cooperation in guiding said slide, means connecting said slide and said auxiliary airfoil, whereby movement of said control surface about its hinge axis causes predetermined relative movement of said auxiliary airfoil for balance purposes, and means for adjusting said slide on said shaft transversely of the axis thereof and in the direction of said guide slot to adjust said auxiliary airfoil for trim, said first mentioned means being connected to said slide at a point which is offset with respect to the hinge axis of said control surface in the direction of said auxiliary airfoil and in the direction of minimum movement of said control surface.

3. A control mechanism for aircraft having a supporting member, a control surface which is hinged to said supporting member for a minimum movement in one direction with respect to a neutral position and a maximum movement in the opposite direction, and an auxiliary airfoil hinged to said control surface, said mechanism being located within the area of the contour lines of said support, said control surface and said auxiliary airfoil and including a shaft, means for mounting said shaft in said control surface in coaxial relation with respect to the hinge axis thereof, a slide formed with an arcuate guide slot in which said shaft is accommodated for cooperation therewith in guiding the slide, means connecting said slide and said auxiliary airfoil, whereby any movement of said control surface about its hinge axis causes predetermined relative movement of said auxiliary airfoil for balance purposes, and means for adjusting said slide on said shaft transversely of the axis thereof and in the direction of said guide slot to adjust said auxiliary airfoil for trim, said second mentioned means being connected to said slide at a point which is offset with respect to the hinge axis of said control surface in the direction of said auxiliary airfoil and in the direction of minimum movement of said control surface.

4. A control mechanism for aircraft having a supporting member, a control surface which is hinged to said supporting member for a minimum movement in one direction with respect to a neutral position and a maximum movement in the opposite direction and an auxiliary airfoil hinged to said control surface, said mechanism including a shaft mounted in said control surface, the axis of said shaft being substantially coincident with the hinge axis of said control surface, a slide formed with an arcuate guide slot in which said shaft is accommodated for cooperation in guiding said slide, means connecting said slide and said auxiliary airfoil, whereby movement of said control surface about its hinge axis causes predetermined relative movement of said auxiliary airfoil for balance purposes, and means for adjusting said slide on said shaft transversely of the axis thereof and in the direction of said guide slot to adjust said auxiliary airfoil for trim, said first mentioned means being connected to said slide at a point which is offset with respect to the hinge axis of said control surface and which moves in a path having an arcuate trend reverse to the trend of the arcuate guide slot formed in said slide, thereby predetermining a substantially constant trim adjustment with slide adjustment.

5. In combination with an aircraft structure, a control surface structure hinged thereto and a tab pivoted to the control surface structure, control means comprising a tab adjusting member movable in a path generally longitudinal of said aircraft structure and a connecting member pivoted to the tab, said members being pivoted together upon a pivot axis that is spaced from the hinge axis upon which the control surface structure is hinged to the aircraft structure, and guide means for said control means effective by and upon movement of said member in said generally longitudinal path for varying the distance between said axes and for simultaneously varying the spacing of said axes in a direction normal to said path, the guide means comprising a slot of generally arcuate form in one of said members and an element having a guide portion extending in guiding relation within said slot, said element being supported by one of said structures with said hinge axis passing through said guide portion.

6. In combination with an aircraft structure, a control surface hinged thereto by means including a hinge pin, a tab pivoted to the control surface, control means comprising a tab adjusting member movable in a path generally longitudinal of said aircraft structure and a connecting member pivoted to the tab, said members being pivoted together upon a pivot axis that is spaced from the axis of said hinge pin, and guide means for said control means effective by and upon movement of said member in said generally longitudinal path for varying the distance between said axes in a direction normal to said path, the guide means comprising a curved slot in one of said members and bearing means provided on said hinge pin and disposed in guiding relation within said slot.

HAROLD J. DAVIS.

REFERENCES CITED

The following references are of record in the file of this patent:

UNITED STATES PATENTS

| Number | Name | Date |
| --- | --- | --- |
| 2,045,667 | Minshall et al. | June 30, 1936 |
| 2,222,435 | Ksoll | Nov. 19, 1940 |
| 2,252,284 | Child | Aug. 12, 1941 |

FOREIGN PATENTS

| Number | Country | Date |
| --- | --- | --- |
| 418,540 | Great Britain | Oct. 26, 1934 |
| 489,392 | Great Britain | July 26, 1938 |
| 508,085 | Great Britain | June 26, 1939 |
| 519,357 | Great Britain | Mar. 21, 1940 |
| 762,480 | France | Jan. 22, 1934 |